United States Patent Office 3,005,465
Patented Oct. 24, 1961

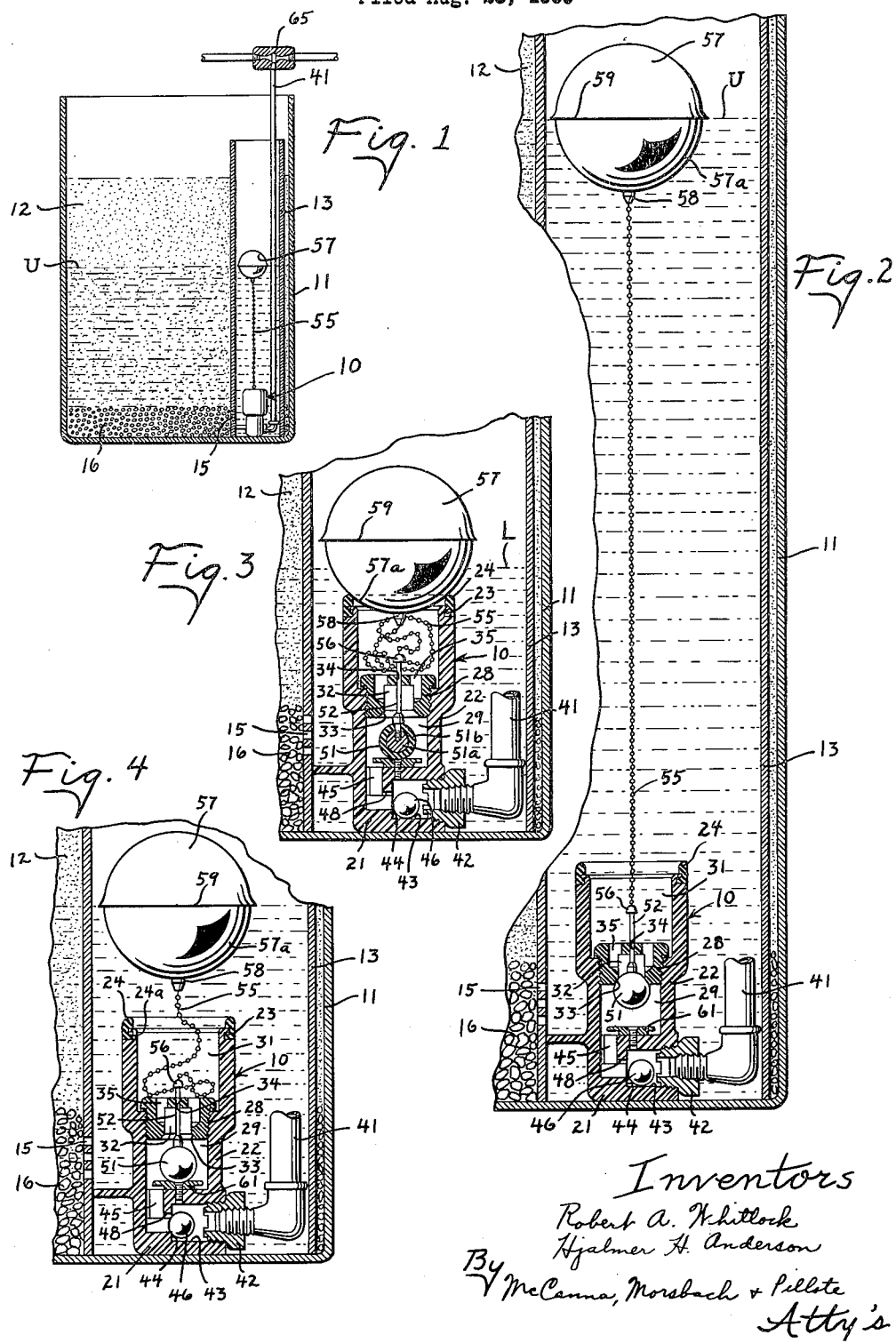

3,005,465
FLOAT VALVE
Robert A. Whitlock and Hjalmer H. Anderson, Rockford, Ill., assignors to Aqua Matic Inc., Rockford, Ill., a corporation of Illinois
Filed Aug. 28, 1959, Ser. No. 836,643
7 Claims. (Cl. 137—391)

This invention relates to liquid level control apparatus for controlling the flow of fluid to and from a tank.

The invention relates particularly to improvements in float control valves of the type disclosed in the patent to R. A. Whitlock No. 2,716,422, wherein a float member is adapted to engage an upper valve seat and block flow from the tank when the liquid reaches a preselected lower level, and wherein the float is connected through a flexible connector to a lower valve member to raise the latter against a lower valve seat and block flow to the tank when the liquid reaches a preselected upper level. These valves are adapted to be mounted in a vertically extending float compartment within the brine tank of a water treatment apparatus and it is a general object of this invention to provide a valve of this type which is more compact in construction so as to reduce the size of the float compartment required in the tank, and which valve is simple and economical in construction and reliable in operation.

Another object of this invention is to provide a float valve of the type described above and having an improved arrangement for guiding the lower valve member and for storing the flexible connector to assure free collapsing and extension of the flexible connector.

A further object of this invention is to provide a float valve of the type described having an improved float and float seat construction which provides more reliable seating of the float to block flow from the tank.

These, together with various ancillary objects and advantages of this invention will be more readily appreciated as the same becomes better understood by reference to the following detailed description when taken in connection with the accompanying drawings wherein:

FIGURE 1 is a sectional view through a tank having the control valve of the present invention mounted therein;

FIG. 2 is a fragmentary sectional view through the tank and control valve and illustrating the valve in the position blocking flow of fluid into the tank;

FIG. 3 is a fragmentary sectional view through the tank and control valve and illustrating the valve in position blocking the flow of liquid from the tank; and FIG. 4 is a fragmentary sectional view through the tank and valve and illustrating the valve in position during refilling of the tank.

The float valve of the present invention is intended for use in a container to control the introduction and withdrawal of liquid therefrom and is specifically designed for use in a regenerant tank or container 11 to control the upper or lower liquid levels in the tank and thereby regulate the amount of regenerant supplied to the treatment apparatus during regeneration thereof. The regenerant tank 11 is adapted to store a quantity of salt 12 and a sleeve or partition 13 is disposed in the tank to separate the latter into a salt compartment outside the sleeve and a float compartment within the sleeve. The sleeve has passages 15 adjacent the lower end thereof communicating the salt compartment with the float compartment to maintain substantially the same liquid levels therein, and a bed 16 of gravel or the like is provided in the salt compartment and overlies the openings 15 to prevent undissolved salt from passing into the float compartment. The valve 10 is disposed within the float compartment to control the flow of fluid to and from the tank and, as will be noted from FIG. 1, the valve is preferably arranged to maintain the upper liquid level designated U below the top of the salt bed 12.

The valve 10 includes a casing having a base 21 and an upwardly extending stepped sleeve portion 22 on the base. The sleeve portion has an outwardly facing peripheral groove 23 formed therein which receives the inwardly extending flange 24a on a resilient ring member 24 forming an upper valve seat. A fitting 28 is threaded into the sleeve portion at a point intermediate the upper and lower ends thereof and separates the sleeve portion into a valve chamber 29 between the fitting and the base 21 and a compartment 31 between the fitting and the upper valve seat 24. The fitting 28 has a reentrant bore 32 in the underside thereof, which bore terminates at the underside of the fitting to form a lower valve seat 33. A stem guide passage 34 is formed in the fitting in alignment with the bore 32 and a plurality of annularly spaced flow passages are formed in the fitting around the guide passage and intersect the bore 32 to permit the flow of liquid between the upper compartment 31 and the valve chamber 29 through the lower valve seat 32.

Liquid is introduced and withdrawn from the valve through a conduit 41, which conduit is connected through a fitting 42 to a lateral passage 43 formed in the base 21 below the valve chamber 29. The lateral passage 43 is stepped intermediate its ends to define a valve seat 44 and communicates through an upwardly extending passage 45 in the base with the bottom of the valve chamber 29. A check valve 46 is disposed in the lateral passage and adapted to engage the seat 44 when liquid flows to the valve chamber 29, and a notch 48 is formed in the valve seat to permit a restricted flow of fluid to the chamber when the check valve is seated. As will be noted, the lateral passage and check valve 46 are located below the sleeve portion 22 of the valve and in substantial vertical alignment therewith, to reduce the overall size of the valve and the size of the float chamber in the tank.

A lower valve member 51 is disposed in the valve chamber 29 and is engageable with the lower seat to block the flow of liquid into the container when the liquid level reaches a preselected upper level. The lower valve member 51 has a stem 52 which is guidably supported in the stem guide passage 34. As best shown in FIG. 3, the lower valve member is spherical in shape and has a spherical metal core 51a and a resilient covering of rubber or the like 51b. The stem 52 is threaded into the core 51a and has a flexible connector 55, herein shown in the form of a bead chain, connected to its upper end by a fastener 56. A float 57, herein shown in the form of a sphere, is attached by a fastener 58 to the upper end of the flexible connector 55. In accordance with the present invention, the float 57 is in the form of a rigid hollow body formed of a non-corrosive material such as plastic and having a smooth underside 57a adapted to engage the resilient upper seat 24 on the valve body to block flow from the tank, when the liquid reaches a lower level designated L in FIG. 3. In order to reduce the tendency of the float to adhere to the walls of the sleeve 13, due to the surface tension of the water, a peripheral flange 59 is formed on the float to extend outwardly therefrom and maintain the main body of the float spaced a short distance from the walls of the sleeve.

Since the lateral passage 43 is located below the valve chamber and communicates therewith adjacent the bottom of the chamber, the fluid entering the valve chamber from the passage will flow past the lower valve member 51. Although the check valve 46 restricts the rate of flow into the valve chamber, any air or gas in the incoming liquid will rapidly expand on entering the chamber. This causes a transient increase in the rate of flow from the valve chamber to the tank and tends to lift the lower valve member 51. In order to prevent premature closing of the lower valve member, a baffle plate 61 is mounted on the base 21 and has an outwardly extending flange spaced above the base and overlying the passage 45 to deflect the incoming water around the lower valve member 51. As shown in FIGS. 3 and 4, the lower valve member 51 is adapted to rest on the baffle 61 until the float 57 reaches its upper level and draws the valve member 51 to its closed position shown in FIG. 2. At that time, the fluid entering the chamber 29 from the line 41 will increase the pressure on the underside of the lower valve member and aid in maintaining the same in its seated position.

From the foregoing it is thought that the operation and construction of the device will be readily understood. Briefly, during the service run of the water treating apparatus, the tank 11 is filled to the upper level U and the valve is in the position shown in FIG. 2, blocking flow into the tank. During the brine injection phase of the regeneration cycle, liquid is withdrawn from the conduit 41, as by an ejector 65 (see FIG. 1). This reduces the pressure at the underside of the lower valve member 51 and draws the same away from the lower seat so that liquid is withdrawn from the tank. As the liquid level decreases, the float 57 moves downwardly and allows the lower valve member 51 to move further away from its seat until it rests on the baffle plate 61. Further downward movement of the float will cause the flexible connector 55 to collapse and collect in the compartment 51 above the fitting 28. As will be noted, the fitting 28 supports the flexible connector when it is collapsed and guides the valve stem 52. When the liquid reaches the lowered level L, the underside of the float 57 engages the upper seat 24 and blocks flow from the tank. During refill the check valve 46 closes and restricts the flow of fluid to the chamber 29, the baffle 61 diffusing the liquid as it enters the chamber to prevent premature seating of the lower valve member. When the float again reaches its upper level, it draws the lower valve member 51 to its closed position and blocks further flow into the tank.

We claim:

1. A float valve of the type adapted to be submerged in a liquid container comprising, a casing defining an internal chamber, said casing having a first passage leading downwardly into said chamber to provide communication between said chamber and the container and a second passage arranged for connection to a conduit, means defining upper and lower valve seats in said first passage, a lower valve member in said chamber cooperable with said lower seat and operative when raised to block the egress of liquid from said chamber through said first passage, float means having an upper valve member movable therewith and adapted to seat on said upper valve seat when said float means is lowered to block the ingress of liquid to the chamber, a stem attached to said lower valve member and extending upwardly through said lower seat, a flexible connector attached to said stem and to said upper valve member, said first passage defining a compartment between said upper and lower valve seats for receiving said connector when the float is in its lowered position, and means in said casing defining a partition between said lower seat and said compartment, said partition having a guide passage therein aligned with said lower seat for guiding said stem and for supporting the flexible connector when the float is in its lowered position, said partition having flow passage means separate from said guide passage for passing fluid between said compartment and said lower seat.

2. A float valve of the type adapted to be submerged in a liquid container comprising, a casing defining an internal chamber, said casing having a first passage extending downwardly into said chamber to provide communication between the chamber and the container and a second passage arranged for connection to a conduit, a resilient ring mounted at the upper end of said first passage defining an upper valve seat, means in said first passage spaced below said upper seat defining a lower valve seat, a lower valve member in said chamber cooperable with said lower seat and operative when raised to block the egress of liquid from said chamber through said first passage, a rigid float member defining a semispherical upper valve member at the underside thereof adapted when the float member is lowered to seat on said resilient seat and block the ingress of liquid to the chamber, a stem attached to said lower valve member and extending upwardly through said lower valve seat, a flexible connector attached to said stem and to said float member, said first passage defining a compartment between said upper and lower seats for receiving said connector when the float is lowered, and means in said casing defining a partition between said lower seat and said compartment, said partition having a guide passage therein aligned with said lower seat for guiding said stem and for supporting said flexible connector when the float is in its lowered position, said partition having flow passage means separate from said guide passage for passing fluid between said compartment and said lower seat.

3. The combination of claim 2 including means defining a sleeve for loosely receiving said float member to guide the latter between its upper and lower positions, and an outwardly extending rib on said float adapted to engage said guide sleeve to space the float member from the sleeve.

4. A float valve of the type adapted to be submerged in a liquid container comprising a hollow casing open at the upper end and having a passage communicating with the interior of the casing adjacent its lower end and adapted for connection to a conduit, means on the upper end of said casing defining an upper valve seat, a fitting detachably mounted in said casing below the upper end thereof separating said casing into a valve chamber below said fitting and compartment above said fitting, said fitting having an annular lower valve seat at the underside thereof and a guide passage aligned with said lower seat, said fitting having flow passages around said guide passage and communicating with said lower seat, a lower valve member in said chamber cooperable with said lower seat and operative when raised to block the egress of liquid from said chamber, a float defining a valve seat at the underside thereof adapted to seat on the upper seat and block the ingress of liquid into the chamber, a stem on said lower valve member extending upwardly through said guide in said fitting, and a flexible connector attached to said stem and to said float, said compartment being dimensioned to receive said connector when the float is in its lowered position.

5. The combination of claim 4 wherein said means defining an upper valve seat comprises a resilient annular ring on the upper end of said casing, said upper valve member on said float comprising a rigid semi-spherical undersurface on the float adapted to seat on said resilient ring.

6. A float valve of the type adapted to be submerged in a liquid container comprising a casing having a base portion and an upwardly extending sleeve portion on said base, means on the upper end of said sleeve portion defining an upper valve seat, a fitting mounted in said sleeve portion intermediate said upper valve seat and said base separating the sleeve into a valve chamber below said fitting and compartment above said fitting, said base having a lateral passage extending into one side thereof below said chamber and an upwardly extending passage communicating the inner end of said lateral passage with the bottom of said chamber, a flow restrictor in said lateral passage below said chamber adapted to limit the rate of flow through the lateral passage into the chamber, said fitting having an annular lower valve seat at the underside thereof and a guide passage aligned with said lower seat, said fitting having annularly spaced flow passages around said guide passage and communicating with said lower seat, a lower valve member in said valve chamber cooperable with said lower seat and operative when raised to block egress of liquid from the chamber, a float adapted to seat on said upper valve seat, a stem on said lower valve member extending upwardly through said guide passage, and a flexible connector attached to said stem and to said float, said compartment being dimensioned to receive the flexible connector when the float is in its lower position.

7. A float valve of the type adapted to be submerged in a liquid container comprising a casing having a base portion and an upwardly extending sleeve portion on said base, means on the upper end of said sleeve portion defining an upper valve seat, a fitting mounted in said sleeve portion intermediate said upper valve seat and said base separating the sleeve into a valve chamber below said fitting and compartment above said fitting, said base having a lateral passage extending into one side thereof below said chamber and an upwardly extending passage communicating the inner end of said lateral passage with the bottom of said chamber, a flow restrictor in said lateral passage below said chamber adapted to limit the rate of flow through the lateral passage into the chamber, said fitting having an annular lower valve seat at the underside thereof and a guide passage aligned with said lower seat, said fitting having flow passages around said guide passage and communicating with said lower seat, a lower valve member in said valve chamber cooperable with said lower seat and operative when raised to block egress of liquid from the chamber, a float adapted to seat on said upper valve seat, a stem on said lower valve member extending upwardly through said guide passage, a flexible connector attached to said stem and to said float, said compartment being dimensioned to receive the flexible connector when the float is in its lower position, and a baffle plate in said chamber adapted to underlie said lower valve member when the latter is in its lower position, said baffle plate overlying said upwardly extending passage and extending outwardly of the periphery of the lower valve member to deflect the incoming liquid around the lower valve member.

References Cited in the file of this patent

UNITED STATES PATENTS

| | | |
|---|---|---|
| 2,518,654 | Backus | Aug. 15, 1950 |
| 2,693,801 | Foreman | Nov. 9, 1954 |
| 2,716,422 | Whitlock | Aug. 30, 1955 |
| 2,904,062 | Techler | Sept. 15, 1959 |